United States Patent

[11] 3,555,970

| [72] | Inventors | Roger D. Borgeson<br>Granada Hills;<br>Naren M. Shah, Santa Monica, Calif. |
|---|---|---|
| [21] | Appl. No. | 751,234 |
| [22] | Filed | Aug. 8, 1968 |
| [45] | Patented | Jan. 19, 1971 |
| [73] | Assignee | Bell Aerospace Corporation<br>a corporation of Delaware |

[54] PRESSURE REGULATOR FOR SERVO VALVE HAVING DYNAMIC LOAD ADAPTIVE RESPONSE
2 Claims, 1 Drawing Fig.

[52] U.S. Cl. ............................................... 91/461,
91/363, 91/365, 137/85, 137/625.62, 137/625.63, 137/625.64
[51] Int. Cl. ........................................................ F15b 9/07
[50] Field of Search ..................................... 137/(Inquired), 625.61, 625.62, 625.63, 625.64; 91/433, 461

[56] References Cited
UNITED STATES PATENTS

| 2,688,314 | 9/1954 | Holm et al. | 91/461 |
|---|---|---|---|
| 3,042,005 | 7/1962 | Gray | 137/625.62X |
| 3,064,627 | 11/1962 | Blanton | 91/433X |
| 3,095,906 | 7/1963 | Kolm, Jr. | 137/625.62 |
| 3,258,025 | 6/1966 | Howland | 137/625.64X |
| 3,260,273 | 7/1966 | Hayner | 137/625.64X |
| 3,296,867 | 1/1967 | Schwien | 137/86X |
| 3,311,123 | 3/1967 | Tsien et al. | 137/625.64X |
| 3,390,615 | 7/1968 | Hayner et al. | 137/625.62X |

Primary Examiner—Martin P. Schwadron
Assistant Examiner—Irwin C. Cohen
Attorney—Nilsson, Robbins, Wills & Berliner ABSTRACT: Disclosed is an electromagnetic hydraulic servo valve which receives input signals to control a pilot stage which in turn positions a power valve responsively thereto. The positioning of the power valve controls the flow of fluid under pressure from a source thereof to an actuator which in turn positions the load connected thereto. An intermediate stage of amplification may be inserted between the pilot stage and the power valve if such is desired. A pressure regulator is inserted between the source of fluid under pressure and the input to the pilot stage and/or the intermediate stage of the servo valve. The pressure regulator is responsive only to the load and in accordance therewith has the differential pressure appearing across the actuator applied to the pressure regulator. In response to a static or dynamic load condition a pressure drop directly proportional to the amount of the pressure difference appearing across the actuator is caused to occur in the fluid applied to the input stages (the pilot or intermediate stage). By regulating the pressure applied to the input stage, the velocity of movement of the power valve, and subsequently the acceleration of the actuator ram are controlled. The fluid pressure to the power valve is not subjected to the pressure regulation by the pressure regulator, hence the static performance of the system is maintained.

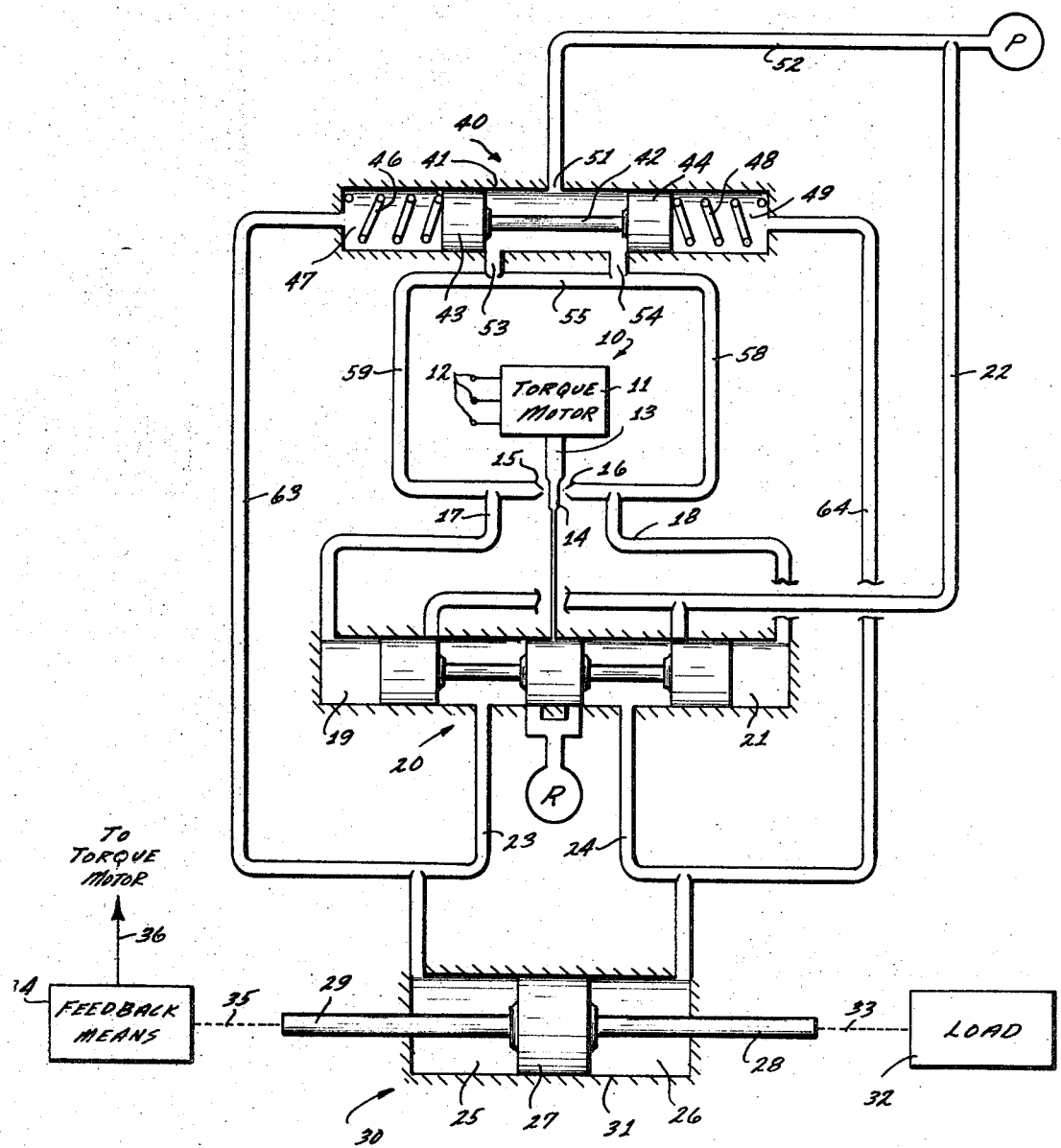

3,555,970

PRESSURE REGULATOR FOR SERVO VALVE HAVING DYNAMIC LOAD ADAPTIVE RESPONSE

FIELD OF THE INVENTION

The field of the invention is hydraulic load positioning apparatus.

BACKGROUND OF THE INVENTION

The basic characteristic of conventional electrohydraulic load positioning servo valve mechanisms is to apply full system pressure to the actuator almost instantaneously with the application of a minimum unbalancing signal to the power valve from the input stages. Such rapid application of full system pressure results in maximum actuator force being applied to the load connected to the actuator. If the load consists of apparatus having large inertia, the overall result is imposition of excessive acceleration forces to the load structure. It is, therefore, desirable that application of actuator force to the load be more gradual so that resistance of the load mass to acceleration does not impose destructive stresses upon the structure coupling the load to the actuator. That is, actuator ram acceleration must be controlled. By this means the stability margin of the system is also improved thereby permitting a higher response system.

Numerous systems have been devised in an attempt to solve the foregoing problems. For example, reference is made to U.S. Pat. No. 3,042,005 issued Jul. 3, 1962 to S. A. Gray and entitled "Dynamic Pressure Feedback Servovalve," U.S. Pat. No. 3,064,627 issued Nov. 20, 1962 to John W. Blanton and entitled, "Derivative Load Pressure Feedback"; and to U.S. Pat. No. 3,138,072 issued Jun. 23, 1964 to S. A. Gray and entitled, "Dynamically Variable Orifice for Load Damping."

Although valves of the type disclosed in these prior art patents have proven exceedingly successful for purposes intended, it has been found that a demand exists for a system which will accomplish the desired end but which is more inexpensive to construct, has greater reliability, and is less susceptible to contamination in the hydraulic fluid. Furthermore, in certain of the prior art systems, a part of the hydraulic flow from the power valve to the actuator is bypassed and sometimes returned to system return. In such a system a hydraulic power supply for the fluid under pressure having a greater capacity is necessary to provide that portion of the fluid under pressure which is bypassed.

SUMMARY OF THE INVENTION

A servovalve system which is automatically adaptive to the dynamic load applied thereto in accordance with the present invention includes an actuator and a source of fluid under pressure. Also included is a power valve which controls the flow of fluid from the source to the actuator. An input stage is provided to supply fluid pressure signals to the power valve responsive to input signals applied thereto. A pressure regulator comprising a spool valve slidably positioned in a chamber is connected between the source of fluid and the input stage. The spool valve is responsive to pressure differentials in the actuator and as the spool valve slides, it closes output ports provided in the chamber thereby to regulate the fluid pressure applied to the input stage and thus the pressure signals applied to the power valve. The connection from the pressure regulator output ports to the input stage has no fixed restriction orifices therein. Thus, by regulating the pressure applied to the input stage, the velocity of movement of the power valve is controlled. By controlling the velocity of the movement of the power valve, the acceleration of the actuator ram is in turn controlled.

BRIEF DESCRIPTION OF THE DRAWING

The single FIG. is a schematic diagram of an electrohydraulic servovalve having a pressure regulator disposed between the source of fluid under pressure and the pilot stage in accordance with the present invention.

DESCRIPTION OF THE ILLUSTRATIVE EMBODIMENT

Referring now to the drawing, there is disclosed an electrohydraulic servovalve having an input stage 10 including a torque motor 11 adapted to receive input signals on terminals 12 so as to position an armature 13 and thereby position a flapper 14 with respect to a pair of nozzles 15—16. As the flapper 14 moves with respect to the nozzles 15—16, a pressure differential is created therein which is applied through the conduits 17 and 18 to chambers 19 and 21 respectively, thereby applying the differential in pressure to opposite ends of the power valve 20. As is illustrated, the power valve 20 controls the flow of hydraulic fluid under pressure from the source P thereof through a conduit 22 and conduits 23 and 24 to the chamber 25 and 26 respectively positioned on opposite sides of the actuator piston 27 forming a part of the load positioning means. Rods 28 and 29 are connected to the piston 27 to form an actuator ram which moves within the cylinder 31, the ram and the cylinder constituting the actuator stage 30. A load 32 is connected to the rod 28 as is illustrated by the dashed line 33. A feedback means 34 is connected to rod 29 as indicated by the dashed line 35. The output of the feedback means is connected through a connection 36 as a feedback signal to the torque motor 11. The feedback signal may be electrical or mechanical or a combination thereof as may be desired in any particular application.

The structure described above is well known in the prior art and further and detailed descriptions and operations thereof may be obtained by reference to prior art patents, such for example as U.S. Pat. No. 2,947,286 issued Aug. 2, 1960 to G. T. Baltus et al. and entitled, "Integrated Actuator." In summary, an input stage 10 receives input signals and provides an output pressure signal which controls the application of fluid under pressure to an actuator stage 30 thereby to position the load 32.

In accordance with the present invention, the velocity of movement of the power valve stage 20 is controlled by a pressure regulator means 40 which is inserted between the source of fluid under pressure P and the input stage 10. As is illustrated, the regulator means 40 includes a cylinder 41 having a spool valve 42 slidably disposed therein. The spool valve includes lands 43, 44 interconnected by a rod as is well known in the art. Spring means 46 is disposed between land 43 and the end wall of the chamber 47 in the cylinder 41 while spring means 48 is disposed between the land 44 and the chamber 49 formed at the opposite end of the cylinder 41. Thus, the spool 42 is spring-loaded by the springs 46 and 48 to a neutral position as illustrated. Furthermore, the springs 46 and 48 determine the magnitude of pressure differential which must be applied across spool valve 42 to effect movement thereof. The cylinder 41 defines a port 51 which is connected by way of conduit 52 to the source P of fluid under pressure. Cylinder 41 also defines output ports 53 and 54 which are connected together by conduit 55. Conduit 58 connects conduit 55 to nozzle 16 while conduit 59 connects conduit 55 to nozzle 15. It should be expressly noted that the typical restriction orifices which are usually disposed in the conduits 58 and 59 are eliminated in accordance with the present invention. Thus an area of difficulty from fluid contamination is eliminated. A conduit 63 connects chamber 25 of the actuator stage 30 to chamber 47 of the pressure regulator stage 40 while a similar conduit 64 connects the chamber 26 with the chamber 49. By the connection of the conduits 63 and 64 pressure differentials appearing across the piston 27 also appear across the spool 42.

To accomplish the desired pressure regulation the ports 53 and 54 are designed such that when they are fully opened, as illustrated in the drawing, the full amount of pressure provided by source P is applied to the conduits 58 and 59 providing fluid directly to the nozzles 16 and 15 respectively. However, upon movement in either direction of the spool 42 one of the output ports 53 and 54 is at least partially closed. As either of the output ports 53 and 54 are closed, a pressure drop occurs there across, thus reducing the pressure which is applied through the conduits 58 and 59 to the nozzles 16 and 15 respectively. As the pressure is reduced, the pressure differential applied across the power valve stage is also reduced, thereby decreasing the velocity of movement of the power valve and thus acceleration of the piston 27.

It should be expressly noted that the output ports of the regulator stage are being closed to obtain the desired pressure regulation. It has been long known in the prior art that in a control valve, such as that at 20, forces are generated by the flow and by the rate of change of flow, that can affect stability of the spool. It has been shown that by proper placement of input and output ports and by causing flow to the load to occur through normally closed output ports across the metering lands of the spool, a greater stability may occur. See "Fluid Power Control" by J. F. Blackburn, G. Reethof, and J. L. Shearer, Technology Press, M.I.T., Cambridge, Mass., and John Wiley & Sons, Inc., New York, N.Y., 1960, pp. 371—377. It has been found that by accomplishing the desired regulation through restricting the normally open output ports of the pressure regulator, the stability of the regulator is enhanced by an unexpected degree.

The degree of movement of the spool 42 in the pressure regulator stage 40 is directly proportional to the pressure difference across the piston 27 in the actuator stage 30. Thus, in the extreme, if a large pressure differential occurs, the land 43 of the spool 42 may completely block the output port 53 or the other land 44 may completely block the other output port 54 and thereby substantially reduce the input pressure to the input stage 10, for example to one-half its full value. By so doing, the acceleration of the ram is substantially reduced thereby eliminating the possibility of damage to the load 32 or the linkages connecting the ram thereto.

It should be expressly noted that the source of fluid under pressure P as applied through the power valve stage 20 to the actuator stage 30 is not subjected to the pressure regulation by the pressure regulator 40. As a result thereof, the static stiffness of the system is maintained; that is, the piston 27 will have minimum movement responsive to forces applied by the load 32 under static conditions.

There has thus been disclosed in some detail a servovalve including a pressure regulator to automatically control ram acceleration. Although a flapper-nozzle input stage has been illustrated, it will be recognized that a jet pipe type input stage may be substituted therefor without departing from the spirit or scope of the invention.

We claim:

1. In an electrohydraulic load positioning system comprising:
   actuator means, including first and second pressure chambers, for positioning a load;
   power valve means operatively connected to supply fluid pressure to said pressure chambers of said actuator means;
   input stage means response to input signals for providing pressure signals to said power valve means;
   means for connecting a source of fluid under pressure to said input stage means; and
   a pressure regulator in said connecting means and comprising:
   a housing defining a cavity having input and output port means;
   first conduit means for connecting a source of fluid under pressure to said input port means;
   second conduit means for connecting said output port means to said input stage means;
   pressure responsive means mounted in said cavity and when in neutral position permitting unimpeded fluid flow from said input to said output port means and movable from said neutral position to impede flow of fluid through said output port means and thereby reduce the pressure applied to said input stage means,
   said pressure responsive means is a spool valve, said spool valve at least partially blocking said output port means, when moved from said neutral position, to reduce said pressure while maintaining said input port means unimpeded; and
   third conduit means connecting said first and second chambers of said actuator means to said pressure responsive means, the movement of said pressure responsive means being effected solely by fluid pressure transmitted thereto by said third conduit means, a fluid discharge orifice in said input stage means, said pressure responsive means being the only impediment in the fluid flow path between said source and said discharge orifice in said input stage means.

2. A load positioning system as defined in claim 1 wherein said output port means includes two openings of equal area defined by said housing and said spool valve includes two lands, one of said lands operating to impede fluid flow through one of said openings and the other of said lands operating to impede fluid flow through the other of said openings.